(12) United States Patent
Owshanko (10) Patent No.: US 10,886,849 B2
(45) Date of Patent: Jan. 5, 2021

(54) REGULATED POWER SUPPLY (71) Applicant: A.B. POWER LTD., Haifa (IL)

(72) Inventor: Avraham Owshanko, Tel-Aviv (IL)

(73) Assignee: A.B. POWER LTD., Haifa (IL)

( * ) Notice: Subject to any disclaimer, the term of this patent is extended or adjusted under 35 U.S.C. 154(b) by 10 days.

(21) Appl. No.: 16/473,696

(22) PCT Filed: Dec. 7, 2017

(86) PCT No.: PCT/IL2017/051325
§ 371 (c)(1),
(2) Date: Jun. 26, 2019

(87) PCT Pub. No.: WO2018/122835
PCT Pub. Date: Jul. 5, 2018

(65) Prior Publication Data
US 2019/0334439 A1 Oct. 31, 2019

(30) Foreign Application Priority Data

Dec. 29, 2016 (IL) .......................................... 249862

(51) Int. Cl.
*H02M 3/158* (2006.01)
*H02M 1/42* (2007.01)
*H02M 3/335* (2006.01)

(52) U.S. Cl.
CPC ....... *H02M 3/1582* (2013.01); *H02M 1/4208* (2013.01); *H02M 3/335* (2013.01)

(58) Field of Classification Search
CPC .. H02M 3/1582; H02M 1/4208; H02M 3/335; H02P 27/06

(Continued)

(56) References Cited

U.S. PATENT DOCUMENTS

| 2014/0097813 A1* | 4/2014 | Dally | H02M 3/158 323/272 |
|---|---|---|---|
| 2015/0029771 A1 | 1/2015 | Hartmann et al. | |
| 2016/0308433 A1* | 10/2016 | Shen | H02M 3/158 |

FOREIGN PATENT DOCUMENTS

| EP | 2424097 A2 * | 2/2012 | .............. H02M 1/15 |
| EP | 2892136 A1 * | 7/2015 | |
| EP | 3035511 A1 * | 6/2016 | .............. H02M 1/12 |

OTHER PUBLICATIONS

Hartmann, et al., A Three-Phase Delta Switch Rectifier for Use in Modern Aircraft, IEEE Transactions on Industrial Electronics, Sep. 2012, pp. 3635-3647, vol. 59, No. 9.

(Continued)

*Primary Examiner* — Shawki S Ismail
*Assistant Examiner* — Monica Mata
(74) *Attorney, Agent, or Firm* — Browdy and Neimark, P.L.L.C.

(57) ABSTRACT

Current regulating techniques utilizing buck-boost circuitries are disclosed. A buck switching device is used in an input stage of a buck-boost circuitry of some embodiments for regulating an input current thereof, and a boost switching device is used in an output stage thereof. A control system is used to set the buck switching device into a closed state at a beginning of each cycle of a periodic timing signal, and open the buck switching device to cause the input current to converge towards a defined target current value, while an unrelated controller changes in each cycle the boost switching device into an open state based on an input/output dependent force-on duty cycle value, and thereafter change the boost switching device back into the closed state whenever the output current of the boost circuit drops below a determined threshold current value.

11 Claims, 7 Drawing Sheets (58) Field of Classification Search
USPC ...... 363/16–20, 21.05, 21.08, 21.12, 45, 84, 363/124, 126, 131
See application file for complete search history.

(56) References Cited

OTHER PUBLICATIONS

Soeiro, et al., Swiss Rectifier—A Novel Three-Phase Buck-Type PFC Topology for Electric Vehicle Battery Charging, Proceedings of the 27th Applied Power Electronics Conference and Exposition (APEC 2012), Feb. 5-9, 2012, Orlando, Florida, USA, pp. 2617-2624.

* cited by examiner

REGULATED POWER SUPPLY

TECHNOLOGICAL FIELD

The present invention is generally in the field of electrical power supply, and particularly relates to current regulated electrical power supply systems and regulated three-phase high power factor electrical power supply systems.

BACKGROUND

Regulated electric power supply systems are required in many applications wherein available power source(s), and/or the load (e.g., laser systems), are subject to fluctuations (such as power grid and generators) that cause fluctuations in the electrical power supplied at the output of these supply systems. For example, in a first stage of a power source, battery chargers, in high voltage capacitor charging applications, such as, but not limited to, flashlamp pumped excimer laser, radar and RF, systems. Thus, a power regulator is typically used to receive the unregulated power of the power supply and provide a relatively bounded voltage level output.

Buck-boost regulators are DC-DC converters commonly used as power stages. Buck-boost DC-DC converters combine the buck (step-down) and boost (step-up) topologies into one circuitry, which can thus provide output voltage magnitudes that are either greater, or smaller, than, the magnitude of the input voltage. In use, buck-boost circuitries may be repeatedly switched between buck and boost operating modes, resulting in input and output pulsating currents, which thus require an output capacitor to supply a continuous load current along the switching cycles. However, the consistent transitions of the buck-boost regulators from the buck operating mode into the boost operating node, and back from the operating boost mode into the buck operating mode, introduces undesired instabilities, which also introduce into the outputted load current disturbances that are difficult to filter out.

Attempts to tackle the problem of efficient current/voltage buck-boost regulators known from the literature usually exhibit instability problems in their controlled ranges. Regulated power supply systems known from the patent literature are briefly described in the following paragraphs.

U.S. Pat. No. 8,525,495 describes a control circuit for a buck-boost circuit including an inductor current sensor and an input current generator. The input current generator accepts a signal from the inductor current sensor and outputs a synthesized and integrated signal representing the average input current to the buck-boost circuit. The input current generator averages the inductor current signal or a zero signal based on the state of the buck switch in the buck-boost circuit.

U.S. Pat. No. 7,893,665 describes peak charging current modulation for burst mode conversion of a four switch buckboost converter. During burst mode operation the input voltage and an output voltage can be detected and a preset peak charging current threshold level can be modulated when the difference between the input voltage and output voltage is within a prescribed range. A burst mode charging cycle will progress until the modulated peak charging threshold level is attained and cut off at the set peak level. A charge transfer cycle and discharge cycle may proceed thereafter.

U.S. Pat. No. 7,394,231 describes a switched regulator circuit that provides step-up and step-down operation in which the level of the input voltage can be greater, equal to, or less than a preset controlled output voltage. A four switch arrangement or two switch arrangement provides buck, boost, and buck-boost regulation under constant frequency valley-peak current mode control. A single sense resistor may be utilized for sensing inductor current during only a short period during each duty cycle. As an alternative to the sense resistor, the switches themselves can be used to sense current during operation.

U.S. Pat. No. 9,099,926 describes a system having a power source that provides alternating current (AC) power and is connected to system ground; a dual-DC bus that provides direct current (DC) power to a load, and comprises a positive line, a negative line, and a midpoint line; an active rectifier that converts AC power from the power source to DC power for the dual-DC bus; and an impedance circuit connected between the midpoint of the dual-DC bus and the system ground that provides impedance for third harmonic common-mode current.

GENERAL DESCRIPTION

Regulated power sources are disclosed, configured to receive an unregulated power supply, carry out stable current control in an input and output stages of a buck-boost circuit, and produce a substantially bounded output voltage level. By adding a degree of freedom in the output/boost stage of the buck-boost circuitry, the control techniques disclosed herein allow highly stable control of the input and output currents, thereby enabling to the buck-boost circuit to operate discontinuous current mode (DCM) while working in continuous current mode (CCM). This scheme also facilitates designs of more complex topologies, such as many-to-one, one-to-many, and three phase high power factor systems.

Embodiments of the regulated power source disclosed herein comprise a controllable buck switching device for regulating input current of the buck-boost circuit, a controllable boost switching device for regulating the output current of the buck-boost circuit, and a control system used to generate control signals for the controllable buck and boost switching devices for maintaining the output of the buck-boost circuitry within a predefined range, while handling input fluctuations and load burst activities (load alterations). The added degree of freedom can be obtained in the boost stage by determining a minimal threshold current value for the buck-boost inductor, and generating control signals for the boost switching device to maintain the output current within a range about the determined threshold current value.

The control system is configured to use a periodic time signal to set the buck switching device into a closed (electrically conducting) state at the beginning of each clock cycle of the periodic time signal. The control system can be configured to maintain the buck switching device and/or the boost switching device in their closed states for some determined time interval starting from the beginning of each clock cycle of the periodic time signal.

The control system can then utilize a current control scheme (e.g., proportional-integral—PI, proportional-derivative—PD, or proportional-integral-derivative—PID) to determine in each clock cycle when to change the buck switching device into its open state for regulating the input current to converge to a defined target current value. This way the current control scheme used by the control system regulates the input current from the unregulated power source by controllably setting the state of the buck switching device in each clock cycle into its open state according to measurement of the input current. Optionally, the state of the buck switching device can be set in each clock cycle into the open state according to measurement of an error current produced using the input current e.g., by means of a differentiator and a the target current as the reference current.

In each clock cycle the control system changes the boost switching device into its open state after a defined time interval elapse from the beginning of the clock cycle. A defined force-on duty cycle may be used by the control system to determine the time interval in which the boost switching device is to be maintained in its closed state starting from the beginning of each clock cycle (also referred to herein as force-on time interval). After setting the boost switching device into the open state, the control system can change the boost switching device back into its closed state when the output current drops below the defined threshold current and maintain it in the closed state until the next cycle.

The force-on duty cycle for determining the force-on time interval can be determined based on a ratio of the input and output voltages ($V_{in}/V_{out}$) and/or past behavior of the buck-boost circuit e.g., a duty cycle of the boost switch device in steady state.

In some embodiments, the control system is configured to receive an external periodic clock signal (e.g., using an analog or a digital pulse generator) and use it for setting the states of the buck and boost switching device, as described hereinabove and hereinbelow. Alternatively, the control system is configured and operable to internally generate the periodic clock signal.

Optionally, and in some embodiments preferably, the buck-boost circuit comprises an intermediate stage comprising one or more intermediating unidirectional conducting devices, such as diode(s). The controllable buck switching device provided in the input stage can be electrically connected in series to the intermediate stage, and the output stage electrically connected in parallel to the intermediate stage. In a basic configuration the intermediate stage comprises a single intermediating unidirectional conducting device, such that the controllable buck switching device is connectable by a first terminal thereof to the unregulated input power source, and the intermediating unidirectional conducting device is connectable via a second input terminal of the input stage to the unregulated input power source. In this way, the buck switching device selectively couples the input stage to the unregulated input power source, for selectively supplying electric currents to the output stage electrically connected in parallel to the intermediating unidirectional conducting device.

The intermediating unidirectional conducting device is configured and arranged to supply output current when the buck switch is in the open state. An input current sensing unit is provided in the input stage for measuring the input current from the unregulated input power source and generating input current data/signals indicative thereof. An input voltage sensing device is used in some embodiments to measure the input voltage over the input terminals of the buck-boost circuit and generate output voltage data/signals indicative thereof.

The output stage comprises an inductive element electrically coupled by a first terminal thereof to the input stage, an output unidirectional conducting device electrically connecting between a second terminal of the inductive element and a first output terminal of the buck-boost circuit, and a boost switching device electrically connecting between the second terminal of the inductive element and a second output terminal of the buck-boost circuit for regulating the output electrical current of the buck-boost circuit. The input, intermediate and output stages share a common line (ground) to which the second terminals of the input and output stage are electrically coupled (or connected).

The output unidirectional conducting device is configured and arranged to conduct electric current when the boost switching device is in an open state. In some embodiments a capacitive element is electrically connected between the output terminals of buck-boost circuit, thereby forming in the output stage a capacitive branch comprising the serially connected output unidirectional conducting device and the capacitive element, said capacitive branch being electrically connected in parallel to the boost switching device. Alternatively, the capacitive element is provided in a load connectable to the output terminals of the buck-boost circuit. An output current sensing unit is also provided in the output stage for allowing comparing the electric output current of the buck-boost circuit to the dynamically set threshold current value, and generating data indicative of whether the output current is above or below the threshold current. Optionally, and in some In some embodiments preferably, the output current sensing unit is configured and arranged for measuring the electric current through the output unidirectional conducting device, and generating output current data/signals indicative thereof.

The output stage unidirectional conducting device is configured to prevent flow of reverse currents from the capacitive element, and/or from the load, to the boost switching device when it is in the closed state, and conduct electric currents from the inductive element to the first output terminal when the boost switching device is in an electrical open (non-conductive) state. An output voltage sensing device is used in some embodiments to measure the voltage over the output terminals of the buck-boost circuit and generate output voltage data/signals indicative thereof.

In some embodiments a transformer is used to electrically couple between the input and output stages of the buck-boost circuit. More particularly, in the intermediate stage, an electrical serial connection of the primary winding of the transformer and the buck switching device is electrically connected to the input terminal of the buck-boost circuit, and the interfacing unidirectional conducting device is connected in parallel to a branch formed by electrical serial connection of the secondary winding of the transformer serially and a secondary unidirectional conducting device. The secondary unidirectional conducting device is configured and arranged to prevent flow of reverse currents from the output stage into the secondary winding of the transformer.

In some embodiments the control system comprises a primary controller for generating the control signals for the buck switching device, and a secondary controller for generating the control signals for the boost switching device. More particularly, the primary controller is configured and operable to set the buck switching device into a closed state at the beginning of each clock cycle of the clock signal, and thereafter use the input current data/signals and the current control scheme for generating the control signals for opening the buck switching device in each clock cycle, to thereby cause the input current to converge to the defined target current value. The secondary controller is configured and operable to use the force-on duty cycle value to determine the force-on time interval from the beginning of the clock cycle after which the state of the boost switching device should be changed into the open state, and based on the output current data/signals change the boost switching device back into the closed state whenever the output current falls below the threshold current value.

In some embodiments the control system further comprises a master controller that supervises operation the whole system. The master controller is configured in some embodiments to determine at least one of the target current value and the threshold current value. The master controller can be configured to receive and process the measurement data and/or signals from the sensing units of the buck-boost circuitry, and determine one or more of the operational parameters for the primary and secondary controllers based thereon. The parameters determined by the master controller can change during system startup or responsive to changes in the input power and/or the output load, and remain substantially constant after a steady state is reached. In some embodiments the master controller is configured to determine a load factor (LF) based on the measured output voltage data/signals (and/or past LF values) e.g., a number in the range of [0, 1]. When the load exhibits a regular behavior, as well as the input power source, the LF remains constant.

Alternatively, the master controller can be configured to receive the LF value from an external source (e.g., as user input or from a memory device). Optionally, and in some embodiments preferably, the master controller is configured to determine the target current used by the primary controller based on the determined, or received, LF value. Optionally, and in some embodiments preferably, the master controller determines the LF value for causing the primary controller to obtain a constant current level in the input stage, or exhibit a resistor-like behavior in the input stage with input current of about $V_{in} \cdot k \cdot LF$, where k is a preset constant of the system.

In some embodiments the master controller is configured to determine the threshold current for the current control scheme of the secondary controller based on at least one of the measured input voltage and a steady state duty cycle of the primary controller e.g., depending on mode of operation. Optionally, the target current for the primary controller is determined based on a preliminary target current value determined for the system.

Optionally, and in some embodiment preferably, the master controller is configured to generate a forcing pulse signal in each clock cycle for forcing the primary controller to set the buck switching device into the closed state for some predetermined time interval at the beginning of each clock cycle. The predetermined time interval for maintaining the buck switching device in the closed from the beginning of each clock cycle can be a preset operational parameter of the system.

The primary controller can use a standard current control scheme using a measurement data and/or signals indicative of the input electric current flowing through the primary winding of the transformer.

The controllers of the control system can be implemented by hardware units, by software modules, or as a combination hardware units and software modules. For example, and without being limiting, the primary and secondary controllers can be implemented in some embodiments by one or more hardware units, and the master controller can be implemented by one or more software modules executed by one or more processor and memory units. Accordingly, the master and each primary and/or secondary controller can be implemented as separate and independent unit/module, configured to implement different and independent control schemes of their respective switch elements.

These configuration of the regulated power supply disclosed herein, wherein the supply current through the input stage is regulated to exhibit a desired behavior, facilitates feeding the power source by multiple unregulated power sources e.g., if an unregulated three-phase power supply is used, or if two different unregulated power sources are used to provide redundancy/power supply backup.

In addition, these configurations also facilitates provision of regulated output voltages to a plurality of different loads. For example, in some embodiments a transformer having multiple secondary windings magnetically coupled to a single primary winding, is used for powering a plurality of output stages. In this configuration, also referred to herein as one-to-many, the input current of the primary winding is regulated by a single primary controller using a current control scheme, measured input current data/signals, target current value and the timing clock signal, as described hereinabove and hereinbelow. The output current in each output stage is regulated by a respective secondary controller using the timing clock signal, respective measured output current data/signals and threshold current value determined by the master controller.

In such one-to-many configuration, the master controller can be configured to process the output voltage measured in each output stage to determine a power consumption value thereof, use the respective power consumption value determined for each output stage to determine a total power consumption values of the system, and use the determined total power consumption to determine the LF value to be used for determining the target current value for the primary controller. This way, the master controller can be configured to determine a respective threshold current value for each secondary controller, based on a ratio of the respective power consumption value determined for the respective output stage and of the determined total power consumption value. Additionally, the master controller can be configured to independently determine the force ON-time-interval (also inferred from the force-on duty cycle value) for each secondary controller based on the state/parameters of the input stage, as in the simple one-to-one configuration.

In a many-to-one embodiment, for example a 2:1 scheme can be utilized, wherein two buck switching devices are used to regulate two input currents from two respective power sources, for driving a single (boost) output stage via two respective transformers. Particularly, the two regulated input currents are respectively supplied to two primary windings of two transformers, and the secondary windings of the transformers drive the output stage. Accordingly, two primary controllers are used for regulating the two input currents from the two respective power sources. The master controller can be configured to determine a respective target current value for each primary controller based on the LF value of the system, if constant input currents are required in the input stages, or alternatively, based on the LF value and the input voltages measured in the input stages, if any other behavior is required in the input stages.

The output stage in such 2:1 scheme can be connected to the secondary windings of the two transformers via a setup of unidirectional conducting devices provided in the intermediate stage and configured to prevent reverse currents therein. Optionally, and in some embodiments preferably, the setup of unidirectional conducting devices comprises a serial unidirectional conducting device serially connected between the secondary windings of the two transformers, and two parallel unidirectional conducting devices, each connected in parallel to a branch comprising one of the secondary windings and the serial unidirectional conducting device. The intermediating unidirectional conducting device connected in parallel to the output stage is also connected in parallel to the secondary windings of the two transformers, that are serially connected by the serial unidirectional conducting device.

A single secondary controller is used in this 2:1 scheme to regulate the output current of the output stage, and the master controller is configured and operable to determine the threshold current value based on state parameters of the two input stages e.g., the duty cycles obtained for the two buck switches in steady state. The LF can be determined by the master controller as in the 1:1 scheme e.g., based on measured output voltage.

The control scheme disclosed herein can be also used to efficiently regulate a three-phase power source for powering two separate and independent power regulators. In these embodiments, an active three-phase rectifier is used to produce from the input three phases P1, P2, and P3, a positive feed line ($V_{POS}$), a negative feed line ($V_{NEG}$) and an intermediate (middle) feed line ($V_{MID}$) e.g., using an active 3-PHASE rectifier, or as described in U.S. Pat. No. 9,099,926, the disclosure of which is incorporated herein by reference. In some embodiments a first power regulator (1:1), or a first one-to-many supply system, is powered by the positive and intermediate feed lines, and a second power regulator (1:1), or a second one-to-many supply system, is powered by the negative and intermediate feed lines. Alternatively, two input stages of 2:1 supply system are respectively powered by the positive and intermediate feed lines and the negative and intermediate feed lines.

A three-phase controller can be configured to continuously, periodically or intermittently, compute a virtual ground $V_{vg}$ form the positive, negative and intermediate feed lines e.g., $V_{POS}+V_{NEG}+V_{MID}$. Optionally, and in some embodiments preferably, a virtual ground generating circuit connected to the positive, negative and intermediate feed lines is used to generate a virtual ground (e.g., using a star connected of resistors, capacitors, inductors, or combinations thereof). The three-phase controller is configured in this case to determine the target current for the first power regulator based on the voltages of the positive feed line and the virtual ground (e.g., $(V_{POS}-V_{vg})*LF*k$), and to determine the target current for the second power regulator based on the voltages of the negative feed line and the virtual ground (e.g., $(V_{vg}-V_{NEG})*LF*k$). The LF values of the system can be a preset system value, or a parameter received from an external source. In some embodiments the LF value is determined by the three-phase controller based on the output voltages of the first and second power regulators respectively connected between the positive and the intermediate feed lines and the intermediate and the negative feed lines.

In some embodiments, one or more auxiliary loads are powered by the voltage between the positive and negative feed lines, where the auxiliary loads are allowed to consume up to 50% of the system power without affecting its performance. An auxiliary current sensing device may be used to measure an auxiliary current consumed by the one or more auxiliary loads, and generate data indicative thereof for determining the target currents based thereon based on the following equations $I_{tar}^A=V_A*LF*k-I_{AUX}$ and $I_{tar}^B=V_B*LF*k-I_{AUX}$.

One inventive aspect of the subject matter disclosed herein relates to an electrical power source comprising a buck-boost circuit having input and output stages, and a control system. The input stage comprises a controllable buck switching device for regulating input current in the input stage. The output stage being electrically coupled to the input stage and comprising a boost switching device. The control system configured and operable to set the buck switching device into a closed state at a beginning of each cycle of a periodic timing signal, use a current control scheme to open the buck switching device so as to cause the input current to converge towards a defined target current value, and in each cycle use a determined force-on duty cycle value to change the boost switching device into an open state and thereafter change the boost switching device back into the closed state whenever an output current of the buck-boost circuit drops below a determined threshold current value.

The control unit can be configured and operable to determine the target current value based on a determined load factor value. Optionally, the control unit is configured and operable to generate the periodic timing signal. Alternatively, at least one of the periodic timing signal, the target current value, the threshold current value, the force-on duty cycle value, and the load factor value, is received in the control system from an external source.

In some embodiments an input current sensing unit is used for measuring the input current of the input stage and generating input current data indicative thereof for carrying out the current control scheme by the control system. An output current sensing unit is optionally used for comparing the output current through the unidirectional conducting device with the threshold current and generating comparative current data indicative thereof for the control system to set the boost switching device into the closed state based thereon.

Optionally, and in some embodiments preferably, an output voltage measurement device is used to measure the voltage between the first and second output terminals of the buck-boost circuit and generate output voltage data indicative thereof. The control unit can be configured to determine at least one of the target current value, the threshold current value and the force-on duty cycle value, based on the output voltage data. Optionally, the control system is configured and operable to determine the input voltage of the buck-boost circuit based on the output voltage data e.g., using the following relationship $V_{in} \times D_{PRIM}=V_{out} \times (1-D_{SEC})$, where $V_{in}$ is the input voltage of the buck-boost circuit, $D_{PRIM}$ is the steady state duty cycle of the buck switch, $V_{out}$ is the output voltage of the buck-boost circuit, and $D_{SEC}$ is the steady state duty cycle of the boost switch.

Alternatively, an input voltage measurement device is used to measure the input voltage of the buck-boost circuit and generate input voltage data indicative thereof. In this case the control system can be configured to determine the output voltage between the first and second output terminals of the buck-boost circuit based on the input voltage data e.g., using the above relationship.

Optionally, the control system is configure and operable to determine one or more values for the load factor value based on the output voltage data accumulated over some predetermined period of time. The control unit can be configured and operable to determine one or more values for the force-on duty cycle value based on states of the buck-boost circuit accumulated over some predetermined period of time. The control unit can be also configured and operable to determine one or more values for the threshold current value based on states of the buck-boost circuit accumulated over some predetermined period of time. The accumulated states of the buck-boost circuit comprises in some embodiments at least one of a duty cycle of the buck switching device, a duty cycle of the boost switching device, measured values of the input voltage, and the output voltage data.

Optionally, and in some embodiments preferably, the buck-boost circuit comprises a transformer for electrically coupling between the input stage and the output stages.

In some embodiments the control system comprises a primary control unit configured and operable to generate control signals for setting the buck switching device into its closed state at the beginning of each cycle and for setting its state thereafter into the open state based on the input current data according to the current control scheme. The control system can use a secondary control unit configured and operable to maintain the boost switching device in the closed state at a beginning of each cycle, for changing the boost switching device into an open state thereafter according to the force-on duty cycle value, and for changing the boost switching device back into the closed state based on the output current data and the threshold current value.

Optionally, and in some embodiments preferably, the secondary control unit is operated with a periodic timing signal having a frequency of about F/m, where m>1 is a positive integer, and F is a frequency of the periodic timing signal used by the primary controller.

Optionally, and in some embodiments preferably, the control system comprises a master control unit configured and operable to determine at least one of the target current value, for regulating the input current by the primary control unit, and the threshold current value for regulating the output current by the secondary control unit.

In some possible embodiments the power source comprises a plurality of the output stages of the buck-boost circuit. In this case, the output current of each of the plurality output stages can be regulated by a respective secondary control unit, and the transformer is configure and operable to electrically couple between the input stage and each one of the plurality of output stages. The master control unit can be configured to determine a respective threshold current value for each of the secondary control units. Optionally, and in some embodiments preferably, the secondary control units are operated with a periodic timing signal having a frequency of about F/m, where m>1 is a positive integer, and F is a frequency of the periodic timing signal used by the primary controller.

The power source comprises in some embodiments at least two input stages, each being electrically serially coupled to the output stage of the buck-boost circuit by a respective transformer. The input current of each of the input stages can be regulated by a respective primary control unit, and the master control unit can be configured to determine a respective target current value for each of the primary control units.

Another inventive aspect of the subject matter disclosed herein relates to an electrical power source configured to receive a three-phase power supply. The electrical power source comprises: an active three-phase rectifier electrically connectable to the three-phase power supply and configured and operable to generate a positive output, a negative output and an intermediate output, therefrom; a virtual ground circuitry electrically connected to the positive, negative and intermediate, outputs, and configured to generate a virtual ground therefrom; a first current controlled power supply electrically connected to the positive and intermediate outputs and configured and operable to regulate an input current thereof based on the positive output and the virtual ground; and a second current controlled power supply electrically connected to the negative and intermediate outputs and configured and operable to regulate an input current thereof based on the negative output and the virtual ground.

The first and second current controlled power supplies can be configured and operable to further use a load factor value for regulating their respective input currents. Optionally, and in some embodiments preferably, the load factor is determined based on at least one output voltage of the first and second current controlled power supplies.

Figure 1A:
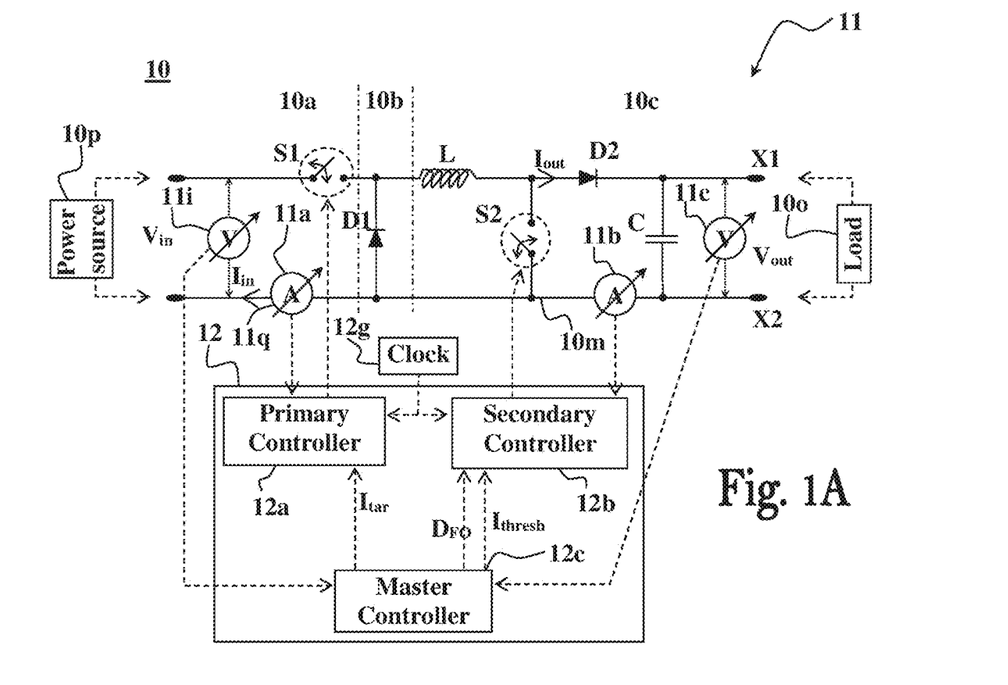
FIGS. 1A to 1E schematically illustrate stabilized power supply systems according to some possible embodiments, wherein FIGS. 1A and 1B schematically illustrates one-to-one embodiments, FIG. 1C schematically illustrates a one-to-many embodiment, FIG. 1D schematically illustrates a possible two-to-one embodiment, and FIG. 1E schematically illustrates a many-to-one embodiment.
Figure 1B:
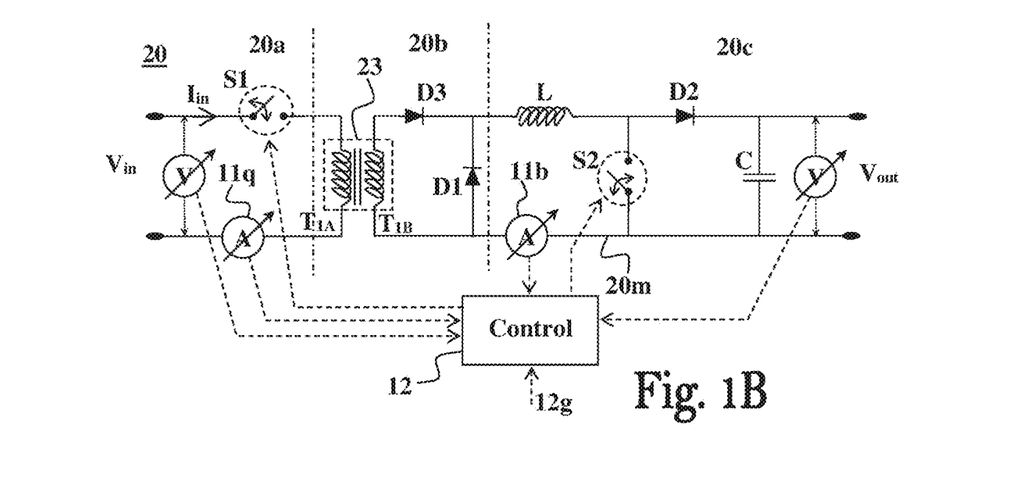

In some embodiments, at least one of the first and second current controlled power supplies comprises the power source of any one of the embodiments described hereinabove and hereinbelow, with or without the transformer for electrically coupling between the input stage and the output stages (e.g., as shown in FIG. 1B).

In other possible embodiments the first and second current controlled power supplies are configured to implement the power source described hereinabove having least two input stages being electrically serially coupled to the output stage of the buck-boost circuit by a respective transformer. In particular, the first and second current controlled power supplies are implement by a configuration of the power source having two input stages and one output stage (as shown in FIG. 1D), wherein the first input stage is electrically connected to the positive and intermediate outputs of the active three-phase rectifier and the second input stage electrically connected to the negative and intermediate outputs of the active three-phase rectifier.

This electrical power source configured to receive a three-phase power supply can be used to supply electrical power to a first load electrically connected to the first current controlled power source, a second load electrically connected to the second current controlled power source, and at least one auxiliary load electrically connected to the positive and negative outputs. Optionally, a target current of each of the power supplies being determined based on the LF value, input voltage, and electrical current through the auxiliary load.

Yet another inventive aspect of the subject matter disclosed herein relates to a method of regulating a buck-boost circuit. The method utilizes a periodic timing signal and comprises setting a buck switch device of the buck-boost circuit into a closed state at the beginning of each cycle of the periodic timing signal and thereafter using a current control scheme to determine when to set the buck switch device within the cycle into an open state for input current of the buck-boost circuit to converge towards a determined target current, and maintaining state of a boost switch device of the buck-boost circuit during a determined force-on time interval from the beginning of the cycle, thereafter setting the boost switch device into an open state and monitoring an output current of the buck-boost circuit for setting the boost switch device into the closed state whenever the output current drops below a determined threshold current value, and maintaining the boost switch device in the closed state until a new cycle of the periodic timing signal begins.

Optionally, the target current is determined based on a load factor of the buck-boost circuit, where the load factor can be determined based on an output voltage of the buck-boost circuit. The threshold current can be determined based on at least one state parameter associated with the buck switch device.

In some embodiments the buck-boost circuit is powered by two of three feed lines of an active three-phase rectifier. The method can comprise generating a virtual ground for the three feed lines of the active three-phase rectifier and determining the target current based on a voltage difference between one of the two feed lines and the virtual ground.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIGS. 3A to 3C schematically illustrate a possible implementation of the master controller according to some possible embodiments, wherein

FIGS. 5A and 5B show various plots of signals and states of various elements and on various lines of the power supply systems according to some possible embodiments, wherein FIG. 5A shows plots for the power supply system shown in FIG. 1B and FIG. 5B show plots for the power supply system shown in FIG. 1C.

DETAILED DESCRIPTION OF EMBODIMENTS

One or more specific embodiments of the present disclosure will be described below with reference to the drawings, which are to be considered in all aspects as illustrative only and not restrictive in any manner. In an effort to provide a concise description of these embodiments, not all features of an actual implementation are described in the specification. This invention may be provided in other specific forms and embodiments without departing from the essential characteristics described herein.

The present application provides novel current control techniques for buck-boost synchronized regulators configured to maintain the output within a predefined range, while handling input fluctuations, as well as load burst activities. The inventor hereof developed new control schemes that allow for a highly stable controlled system by adding a degree of freedom in the boost stage. Though the efficiency may be affected, in comparison to optimal systems, the embodiments disclosed herein enable to devise complex topologies, such as many-to-one, one-to-many, and three phase high power factor power supply systems.

FIG. 1A schematically illustrates a regulated one-to-one (1:1) power supply system 10 according to some possible embodiments (i.e., having a single power input terminal and a single power output terminal), comprising a buck-boost circuitry 11 and control system 12 configured and operable to stabilize the electrical current $I_{in}$ supplied by the unregulated input power source $V_{in}$ at the input stage 10a of the buck-boost circuitry 11, and regulate the output current $I_{out}$, to provide a substantially bounded output voltage $V_{out}$ at its output stage 10c. The input stage 10a of the buck-boost circuitry 11 comprises a controllable buck switch device S1 (such as a solid state switching element) configured to selectively couple the input stage 10a to the unregulated input power source 10p, and an input current sensing device 11a configured and arranged to measure the input current $I_{in}$ from the unregulated power source 10p and generate input current data/signals indicative thereof.

An intermediate stage 10b of the buck-boost circuitry 11 comprises an intermediating diode D1 serially connected between the buck switch S1 and the unregulated input power source $V_{in}$, and connected in parallel to the output stage 10c of the buck-boost circuit 11. The intermediating diode D1 is configured and arranged to supply output current when the buck switch S1 is in an open state. The output stage 10c of the buck-boost circuit 11 comprises an inductive element L electrically connected by a first terminal thereof to the first switch device S1 and to the interfacing diode D1, a boost switch S2 (such as a solid state switching element) electrically connected to a second terminal of the inductive element L and configured to selectively electrically couple the inductive element L to the common conductor/ground 10m (common to the input and output stages, 10a and 10c), and an output diode D2 electrically connected to the second terminal of the inductor L and to the boost switch S2.

The serial connection between the inductor L and the boost switch S2 forms an inductive branch of the output stage 10c, that is electrically connected in parallel to the intermediating diode D1. As seen in FIG. 1A, the output diode D2 is electrically connected between the inductor L and a first output terminal X1 of the circuit 11, and the boost switch S2 is electrically connected between the inductor L and the second output terminal X2 of the circuit 11.

An output current sensing device 11b is used in the output stage 10c for comparing the output current $I_{out}$ through the output diode D2 to a threshold current defined for the output stage, and generate output current data/signals indicative thereof. In some embodiments a capacitor C connected between the first (X1) and second (X2) output terminals of circuit 11 is used for supplying the output voltage $V_{out}$ to the load 10o. In this configuration, a capacitive branch comprising the output diode D2 serially connected to the capacitor C is connected in parallel to the boost switch device S2. The output diode D2 is configured and arranged to conduct electric current when the boost switch S2 is in an electrical open (non-conducting) state, and to prevent passage of electric charges from the capacitive element C to the inductive element L when the boost switch S2 is in an electrical closed (conducting) state. Alternatively, the capacitive element C is provided in the load 10o, and in this case the buck-boost circuit 11 can be constructed without the capacitor C.

Optionally, and in some embodiments preferably, an output voltage sensing device 11e is used for measuring the output voltage $V_{out}$ between the output terminals X1 and X2 of the output stage 10c, and generate output voltage data/signals indicative thereof. Alternatively or additionally, an input voltage sensing device 11i is used for measuring the input voltage $V_{in}$ supplied to the buck-boost circuit 11 by the unregulated input power source 10p, and generate input voltage data/signals indicative thereof. As the regulated power supply system 10 is configured to regulate the electric current Iin at the input stage 10a, the capacitive element C optionally provided in the output stage 10c permits the output voltage $V_{out}$ to fluctuate according to changes in the unregulated power supply $V_{in}$, and according to any possible changes in the load 10o, which the output stage 10c may experience during operation of the regulated power supply system 10.

The control system 12 comprises the primary and secondary controllers, 12a and 12b, for respectively controlling the states of the buck and boost switches, S1 and S2. A clock signal generator 12g is used for providing the first and second controllers a synchronizing periodic time signal. The primary controller 12a is configured and operable to set the buck switch S1 into the closed (electrically conducting) state at the beginning of each clock cycle of the clock signal generator 12g, and may maintain at least one of the buck and boost switches in the closed states for some determined time interval starting from the beginning of the clock cycle.

In some embodiments, the primary controller 12a is configured to carry out a current control scheme for generating control signals for the buck switch S1 after setting it into the closed state at the beginning of each clock cycle. The current control scheme is configured to monitor the input current $I_{in}$ data/signals from the input current sensing device 11a and based thereon change the buck switch S1 into the open state, and maintain it in the open state until the end of the clock cycle, thereby causing the input current $I_{in}$ to converge to a determined target current value Iiar. Accordingly, in steady state, the input current $I_{in}$ in the input stage 10a is maintained substantially equal to the determined target current value $I_{tar}$.

In some embodiments the secondary controller 12b is configured and operable to maintain the boost switch S2 in the closed state within a time interval starting from the beginning of each clock cycle (also referred to herein as force-on time interval), said time interval being determined based on a determined force-on duty cycle value $D_{FO}$, and thereafter change the boost switch into its open state. Thereafter, the secondary controller 12b monitors the output current bout data/signals from the output current sensing device 11b and changes the state of the boost switch S2 back into the closed state whenever the output current bout drops below a determined threshold current $I_{thresh}$.

In some embodiments a master controller 12c is used for monitoring state parameters of the regulated power supply system 10 and determine based thereon at least one of the target current $I_{tar}$ for the primary controller 12a, the threshold current $I_{thresh}$ for the secondary controller 12b, and the force-on duty cycle ($D_{FO}$) used by the secondary controller 12b to determine the time interval for maintaining the boost switch S2 in the closed state from the beginning of each clock cycle.

Optionally, and in some embodiments preferably, a determined load factor (LF) value is used by the primary controller 12a to determine the target current $I_{tar}$ used by the current control scheme for regulating the input current $I_{in}$. In some embodiments the master controller is configured and operable to monitor at least one of the measured input voltage $V_{in}$ and the measured output voltage $V_{out}$, for determining the target current $I_{tar}$ and/or the LF for the primary controller 12a, and/or the threshold current $I_{thresh}$ for the secondary controller 12b, and/or the force-on duty cycle ($D_{FO}$) for determining the force-on time interval for the boost switch S2. In some embodiments the master controller 12c is configured and operable to determine the target current $I_{tar}$ used by the primary controller 12a in the current control scheme of the buck switch S1, and/or the LF of the power source, based on a ratio of the measured output ($V_{out}$) and input ($V_{in}$) voltages.

In some embodiments the system is configured to measure on the input voltage ($V_{in}$) supplied to the input stage 10a, and determined the output voltage over the output terminals (X1 and X2) of the output stage based on the following equation—

$$V_{in} \times D_{PRIM} = V_{out} \times (1 - D_{SEC}),$$

where $D_{PRIM}$ is the steady state duty cycle of the buck switch and $D_{SEC}$ is the steady state duty cycle of the boost switch. Alternatively, only the output voltage ($V_{out}$) is measured and the input voltage ($V_{in}$) is determined based on the above equation.

FIG. 1B schematically illustrates a one-to one power supply system 20 utilizing an isolating transformer 23 in the intermediate stage 20b, to buffer between the input stage 20a and the output stage 20c of the system 20. In this embodiment the buck switch S1 in the input stage 20a is configured and arranged to selectively electrically couple the primary winding $T_{1A}$ of the transformer 23 to the unregulated input power source (10p in FIG. 1A). The intermediate stage 20b comprises the primary and secondary windings of the transformer 23, a buffering diode D3 serially connected to the secondary winding $T_{1B}$ of the transformer 23, and the intermediating diode D1 electrically connected in parallel to the branch of the serially connected buffering diode D3 and the secondary winding $T_{1B}$.

The control system 12 is substantially similar to the control system 12 shown in FIG. 1A. The output stage 20c of the power supply system 20 is also substantially similar in structure and functionality to the output stage 10c of the buck-boost circuit 11 shown in FIG. 1A. Thus these parts will not be described again for the sake of brevity.

Figure 1C:
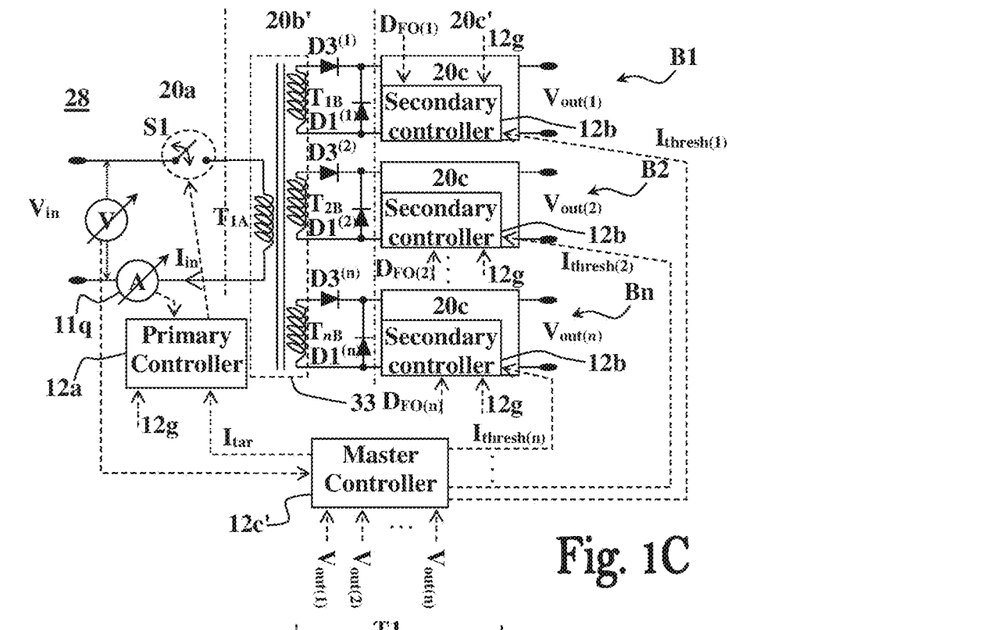
Figure 1D:
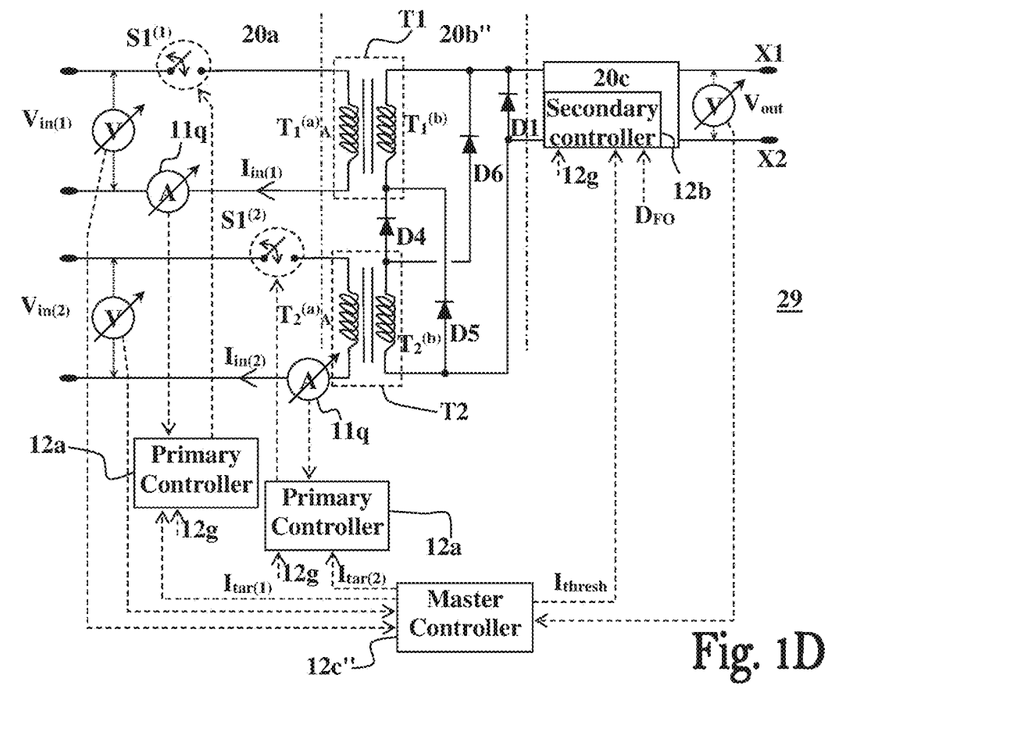

FIG. 1C schematically illustrates a one-to-many (1:n, where n>1 is a positive integer) power supply system 28 configured to receive an unregulated input power source $V_{in}$ and produce a plurality of different substantially bounded output voltages $V_{out(1)}, V_{out(2)}, \ldots, V_{out(n)}$. The input stage 20a of the power supply system 28, and its primary controller 12a, are substantially similar to the input stages described hereinabove with reference to FIGS. 1A and 1B. The intermediate stage 20b' of the power supply system 28 comprises a transformer 33 having a single primary winding $T_{1A}$ electrically connected in series to the buck switch S1, and a plurality of secondary windings $T_{1B}, T_{2B}, \ldots, T_{nB}$, magnetically coupled to the primary winding $T_{1A}$. Also in the intermediate stage 20b', each secondary winding $T_{iB}$ (where 2≤i≤n is a positive integer) is serially connected to a respective buffering diode $D3^{(i)}$, and a respective intermediating diode $D1^{(i)}$ is electrically connected in parallel to the branch comprising secondary winding $T_{iB}$ and the buffering diode $D3^{(i)}$ serially connected to it in each intermediate stage 20b'.

The output stage 20c' comprises a plurality of the output stage secondary circuits $B_1, B_2, \ldots, B_n$, each having its respective 1:1 output stage 20c/10c and secondary controller 12b, which are structurally and functionally similar to the same units shown in FIGS. 1A and 1B, as described hereinabove. The output stage 20c of each secondary circuitry $B_1, B_2, \ldots, B_n$, is electrically connected in parallel to the respective intermediating diode D1 provided in the intermediate stage 20b', to receive its power supply from the respective secondary winding $T_{1B}, T_{2B}, \ldots, T_{nB}$. each secondary circuitry $B_1, B_2, \ldots, B_n$, is configured to produce a respective regulated output voltage $V_{out(1)}, V_{out(2)}, \ldots, V_{out(n)}$, for powering a respective load (not shown).

The state of the buck switch S1 of the input stage 20a is controlled by the primary controller 12a, using the periodic time signal 12g, the current control scheme and the target current value $I_{tar}$, substantially as described herein above.

Similarly, each secondary controller 12b is configured and operable to generate control signals for setting the state of the respective boost switch S2 using the periodic time signal 12g and respective force-on duty cycle ($D_{FO}$) and threshold current $I_{thresh(i)}$ values. The primary controller 12a and the secondary controllers 12b are configured and operable to carry out the same control scheme described hereinabove with reference to FIG. 1A. A master controller 12c' can be used to operate the power supply system 28, monitor its state and determine at least one of the target current $I_{tar}$ for the primary controller 12a, and the force-on duty cycle ($D_{FO}$) and threshold current $I_{thresh}$ for each secondary circuitry $B_i$.

In some embodiments, an output voltage sensing device (not shown) is used to measure the $V_{out(1)}$, $V_{out(2)}$, ..., $V_{out(n)}$, over the output terminals of its respective output stage 20c, and generate respective output voltage data/signals indicative thereof. The master controller 12c' is configured and operable in this case to monitor the output voltages $V_{out(1)}$, $V_{out(2)}$, ..., $V_{out(n)}$, of the secondary circuitries $B_1, B_2, ..., B_n$, and generate respective threshold currents $I_{thresh(1)}, I_{thresh(2)}, ..., I_{thresh(n)}$, for producing the substantially bounded voltage output of each secondary circuitry.

Optionally, and in some embodiments preferably, the master controller 12c' is configured and operable to process the output voltage $V_{out(i)}$ measured in the output stage 20c of each secondary circuitry $B_i$ to determine a power consumption value $P_{(i)}$ thereof, use the respective power consumption value $P_{(i)}$ determined for the output stage 20c of each secondary circuitry $B_i$ to determine a total power consumption value $P_T = SUM(P_{(i)})$ (for $1 \le i \le n$) of the system 28, and use the determined total power consumption value $P_T$ to determine the LF value to be used for determining the target current value $I_{tar}$ for the primary controller 12a. The master controller 12c' can be also configured to determine a respective threshold current value $I_{thresh(i)}$ for each secondary controller 12b, based on a ratio of the respective power consumption value P(i) determined for the respective output stage and of the determined total power consumption value $P_T$. Additionally, the primary controller 12c' can be configured to independently determine the force-on duty cycle time $D_{FO(i)}$ for each secondary controller 12b in each secondary circuitry $B_i$ based on the state/parameters of the input stage, as in the simple one-to-one configuration described hereinabove with reference to FIG. 1A.

FIG. 1D schematically illustrates a two-to-one (2:1) power supply system 29, configured to regulate two input currents $I_{in(1)}$ and $I_{in(2)}$ from two respective independent unregulated power sources $V_{in(1)}$ and $V_{in(2)}$, and produce a substantially bounded and stabilized output voltage $V_{out}$ for power a load (not shown) connected to its output terminals X1 and X2. The power supply system 29 thus comprises two input stages 20a, each configured and arranged to selectively and independently couple a respective primary winding $T_1^{(a)}$ and $T_2^{(a)}$ to a respective unregulated power source $V_{in(1)}$ and $V_{in(2)}$ by a respective buck switch $S1^{(1)}$ and $S1^{(2)}$. The intermediate stage 20b" of the power supply system 29 comprises two separate and independent transformers T1 and T2. The primary windings ($T_1^{(a)}$ and $T_2^{(a)}$) of each transformer is electrically connected to a respective buck switch ($S1^{(1)}$ $S1^{(2)}$), and the secondary winding ($T_1^{(b)}$ and $T_2^{(b)}$) of each transformer is electrically coupled to the output stage 20c via a setup of intermediating/buffering diodes, D1, D4, D5 and D6.

The diodes setup in the intermediate stage 20b" comprises a serial diode D4 serially connected between the secondary windings $T1^{(b)}$ and $T2^{(b)}$, and two parallel diodes, D5 and D6, each connected to a branch comprising a different secondary winding and the serial diode D4. More particularly, the parallel diode D5 is electrically connected in parallel to the branch comprising the serial connection of the serial diode D4 and the secondary windings $T2^{(b)}$, and the parallel diode D6 is electrically connected in parallel to the branch comprising the serial connection of the serial diode D4 and the secondary windings $T1^{(b)}$. The intermediating diode D1 electrically connected in parallel to the output stage 20c, is also electrically connected in parallel to the secondary windings $T1^{(b)}$ and $T2^{(b)}$ of the transformers T1 and T2, where the secondary windings $T1^{(b)}$ and $T2^{(b)}$ are serially connected by the serial diode D4.

The master controller 12c" of the power supply system 29 can be configured to determine a respective target current value $I_{tar(1)}$ and $I_{tar(2)}$ for each primary controller 12a based on the LF value of the system, if constant input currents $I_{in(1)}$ and $I_{in(2)}$ are required in the input stages 20a. Alternatively, in some embodiments, the target current values $I_{tar(1)}$ and $I_{tar(2)}$ are determined based on the LF value and the input voltages $V_{in(1)}$ and $V_{in(2)}$ measured in the input stages 20a, if any other behavior is required in the input stages.

A single secondary controller 12b is provided in the power supply system 29 to regulate the output current of the output stage 20c. The master controller 12c" is configured and operable to determine the threshold current value $I_{thresh}$ based on state parameters of the two input stages 20a e.g., the steady state duty cycles obtained for the two buck switches $S1^{(1)}$ and $S1^{(2)}$. The LF can be determined by the master controller 12c" as in the 1:1 configuration shown in FIG. 1A and described hereinabove e.g., based on measured output voltage $V_{out}$ as exemplified in FIGS. 3A-B.

Figure 1E:
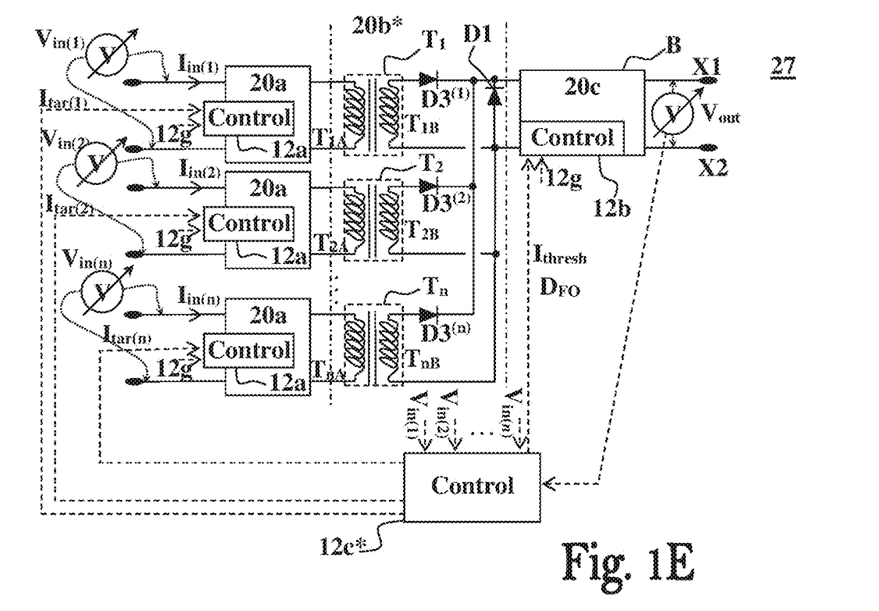

FIG. 1E schematically illustrates a many-to-one power supply system 27 according to some possible embodiments. The power supply system 27 is configured to regulate a plurality of input currents $I_{in(1)}, I_{in(2)}, I_{in(n)}$ from a respective plurality of independent unregulated power sources $V_{in(1)}, V_{in(2)}, ..., V_{in(n)}$, and produce a substantially bounded and stabilized output voltage $V_{out}$ for powering a load (not shown) connected to its output terminals X1 and X2. Accordingly, the power supply system 27 comprises a plurality of input stages 20a, each configured and operable to selectively and independently couple a respective primary winding $T_{1A}$ and $T_{2A}, ..., T_{nA}$, to a respective unregulated power source $V_{in(1)}, V_{in(2)}, ..., V_{in(n)}$, by a respective buck switch $S1^{(1)}, S1^{(2)}, ..., S1^{(n)}$ (not shown).

The intermediate stage 20b* of the power supply system 27 comprises a plurality of independent transformers T1, T2, ..., Tn. The primary windings $T_{iA}$ of each transformer $T_i$ is electrically connected to a respective buck switch $S1^{(i)}$ (not shown), and the secondary winding $T_i^{(b)}$ of each transformer $T_i$ is electrically coupled to the output stage 20c via a respective buffering diode $D3^{(i)}$ serially connected to the secondary winding $T^{iB}$ of the respective transformer $T_i$. More particularly, for each transformer $T_i$ in the intermediate stage 20b* there is a branch comprising a respective buffering diode $D3^{(i)}$ serially connected to the respective secondary winding $T_i^{(b)}$ of the transformer $T_i$, and each of these branches is electrically connected in parallel to the intermediating diode D1. The intermediating diode D1 is electrically connected in parallel to the output stage 20c.

The master controller 12c* of the power supply system 27 is configured and operable to determine a respective target current value $I_{tar(i)}$ for each primary controller 12a based on the LF value of the system, if constant input currents $I_{in(i)}$ are required in the input stages 20a. Alternatively, in some embodiments, the target current values $I_{tar(i)}$ are determined based on the LF value and the input voltages $V_{in(i)}$ measured in the input stages 20a, if any other behavior is required in the input stages. A single secondary controller 12b is provided in the power supply system 27 to regulate the output current of the output stage 20c. The master controller 12c* is configured and operable to determine the threshold current value $I_{thresh}$ based on state parameters of the plurality of input stages 20a e.g., the steady state duty cycles obtained for the buck switches $S1^{(i)}$. The LF value can be determined by the master controller 12c* as in the 1:1 configuration shown in FIG. 1A and described hereinabove e.g., based on measured output voltage $V_{out}$ as exemplified in FIGS. 3A-B.

Figure 2:
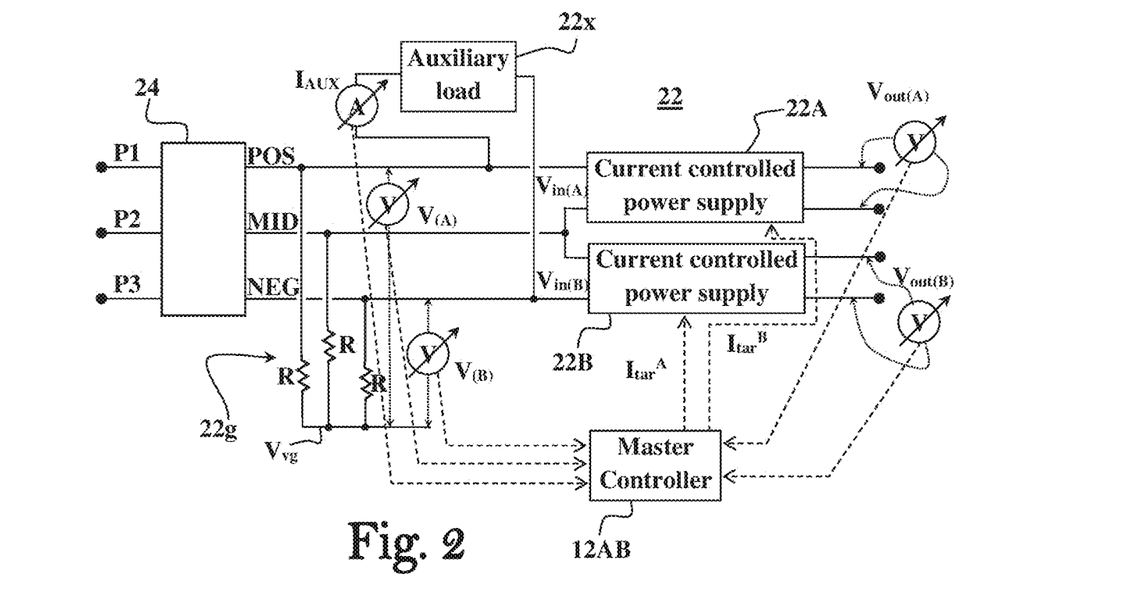
FIG. 2 schematically illustrates a regulated power supply system configured to receive an unregulated three phase power source, according to some possible embodiments and achieve a high power factor.

FIG. 2 schematically illustrates a power supply system 22 configure and operable to regulate three phases, P1, P2 and P3, of a three-phase power source, for powering two or more separate and independent loads (not shown). The power supply system 22 utilizes an active three-phase rectifier 24 to produce from the input three phases P1, P2, and P3, a positive feed line POS, a negative feed line NEG and an intermediate (middle) feed line MID e.g., using a standard 3-phase bridge, or as described in U.S. Pat. No. 9,099,926, the disclosure of which is incorporated herein by reference i.e., $V_{POS}=\max(V_{P1}, V_{P2}, V_{P3})$, $V_{NEG}=\min(V_{P1}, V_{P2}, V_{P3})$ and $V_{MID}=V_{P1}+V_{P2}+V_{P3}-V_{POS}-V_{NEG}$.

The voltage $V_{in(A)}$ between the POS and MID feed lines is used to power a first current controlled power supply system 22A, and the voltage $V_{in(B)}$ between the MID and NEG feed lines is used to power a second current controlled power supply system 22B. In some embodiments at least one of the first and second current controlled power supply systems, 22A and 22A, is a one-to-one power supply system (1:1, 10 and 20 shown in FIGS. 1A and 1B, respectively), or a one-to-many supply system (1:M, 28 as shown in FIG. 1C). Alternatively, two input stages of the 2:1 power supply system 29 shown in FIG. 1D are respectively powered by the voltages $V_{in(A)}$ (between the POS and MID feed lines) and $V_{in(B)}$ (between the MID and NEG feed lines).

The three-phase controller 12AB is configured and operable to continuously, periodically or intermittently, compute a virtual ground $V_{vg}$ from the positive (POS), negative (NEG) and intermediate (MID) feed lines e.g., $V_{POS}+V_{NEG}+V_{MID}$. Optionally, and in some embodiments preferably, a virtual ground circuit 22g connected to the POS, NEG and MID feed lines is used to generate the virtual ground $V_{vg}$ (e.g., using a star connection of resistors, capacitors, inductors, or combinations thereof). The three-phase controller 12AB is configured in this case to determine the target current $I_{tar}^A$ for the first current controlled power supply system 22A based on the voltage between the POS feed line and the virtual ground $V_{vg}$ (e.g., $(V_{POS}-V_{vg})*LF*k$, where k is a preset system constant), and to determine the target current $I_{tar}^B$ for the second current controlled power supply system 22B based on the voltage between the NEG feed line and the virtual ground $V_{vg}$ (e.g., $(V_{vg}-V_{NE}G)*LF*k$). The LF value can be determined by the three-phase controller 12AB in some embodiment based on the output voltages $V_{out(A)}$ and $V_{out(B)}$.

The LF values of the system can be a preset system value or a parameter received from an external source. In some embodiments the LF value is determined by the three-phase controller 12AB based on the output voltages $V_{out(A)}$ and $V_{out(B)}$ of the first and second current controlled power supply systems, 22A and 22B.

In some embodiments, one or more auxiliary loads 22x are powered by the voltage between the POS and NEG feed lines. In some embodiments, the auxiliary loads 22x are configured to consume up to 50% of the system power without affecting its performance. In this case, an auxiliary current sensing device is used for measuring the current $I_{AUX}$ consumed by the one or more auxiliary loads 22x. The measured auxiliary current $I_{AUX}$ is used by the three-phase controller 12AB for determining the target currents $I_{tar}^A$ and $I_{tar}^B$, as follows:

$$I_{tar}^A = V_A * LF * k - I_{AUX} \text{ and } I_{tar}^B = V_B * LF * k - I_{AUX}.$$

Figure 3A:
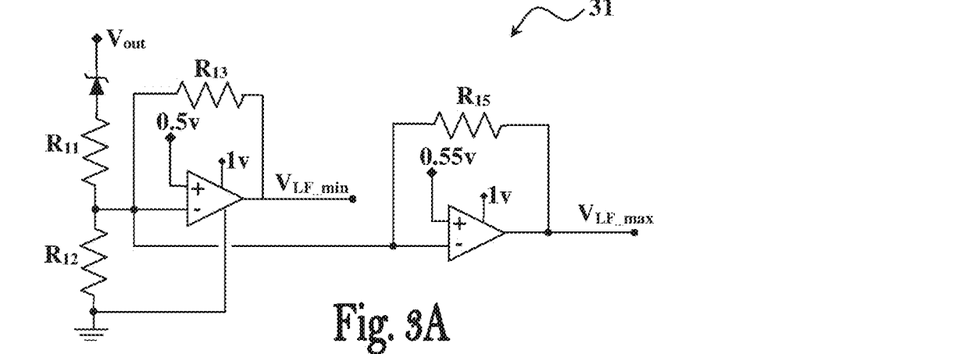
FIG. 3A shows circuitry for generating minimum and maximum boundaries for the load factor based on the measured output voltage.

FIG. 3A schematically illustrates a circuitry 31 configured and operable for generating reference voltages, $V_{LF\_min}$ and $V_{LF\_max}$, referencing minimum and maximum boundaries, respectively, usable for determining the load factor (LF) by the mater controller, based on the measured output voltage $V_{out}$ of a secondary stage of any one of the power supply system embodiments disclosed herein.

Figure 3B:
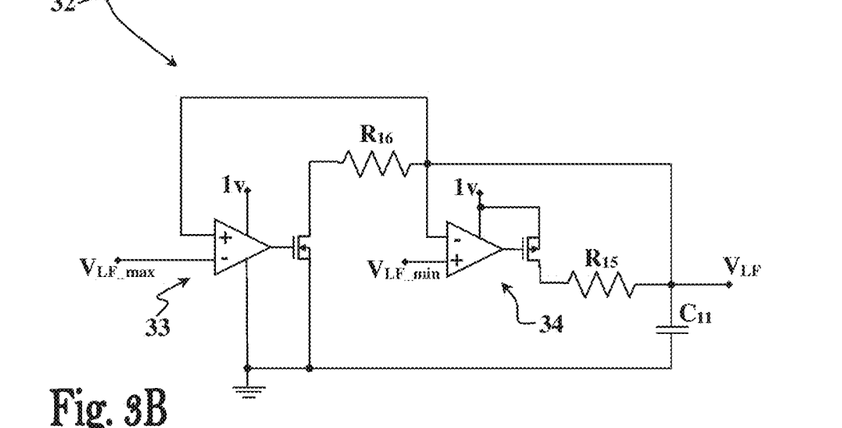
FIG. 3B shows circuitry for generating the load factor based on the generated load factor minimum and maximum boundaries.

FIG. 3B schematically illustrates a circuitry 32 usable for generating a reference voltage $V_{LF}$ usable for determining the LF by the master controller, based on the LF minimum and maximum boundary reference voltages, $V_{LF\_min}$ and $V_{LF\_max}$, generated by the circuitry 31 of FIG. 3A.

Figure 3C:
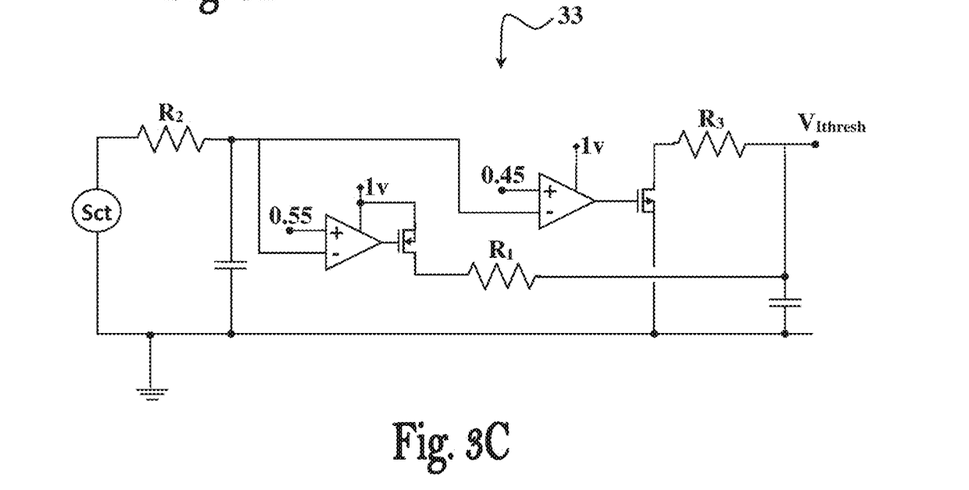
FIG. 3C shows circuitry for generating the threshold current for the secondary controller.

FIG. 3C schematically illustrates a circuitry 33 configured and operable for generating a reference voltage $V_{Ithresh}$ usable for determining by the master controller the threshold current $I_{thresh}$ for a secondary controller of any of the power supply systems described herein. In this specific and non-limiting example the circuitry 33 is configured generate the reference voltage $V_{Ithresh}$ based on the state of the buck switch (S1) i.e., the signal source Set is configured to output 1 Volt when the buck switch is in the closed (ON) state, and 0 Volt when the buck switch is in the open (OFF) state.

Figure 4:
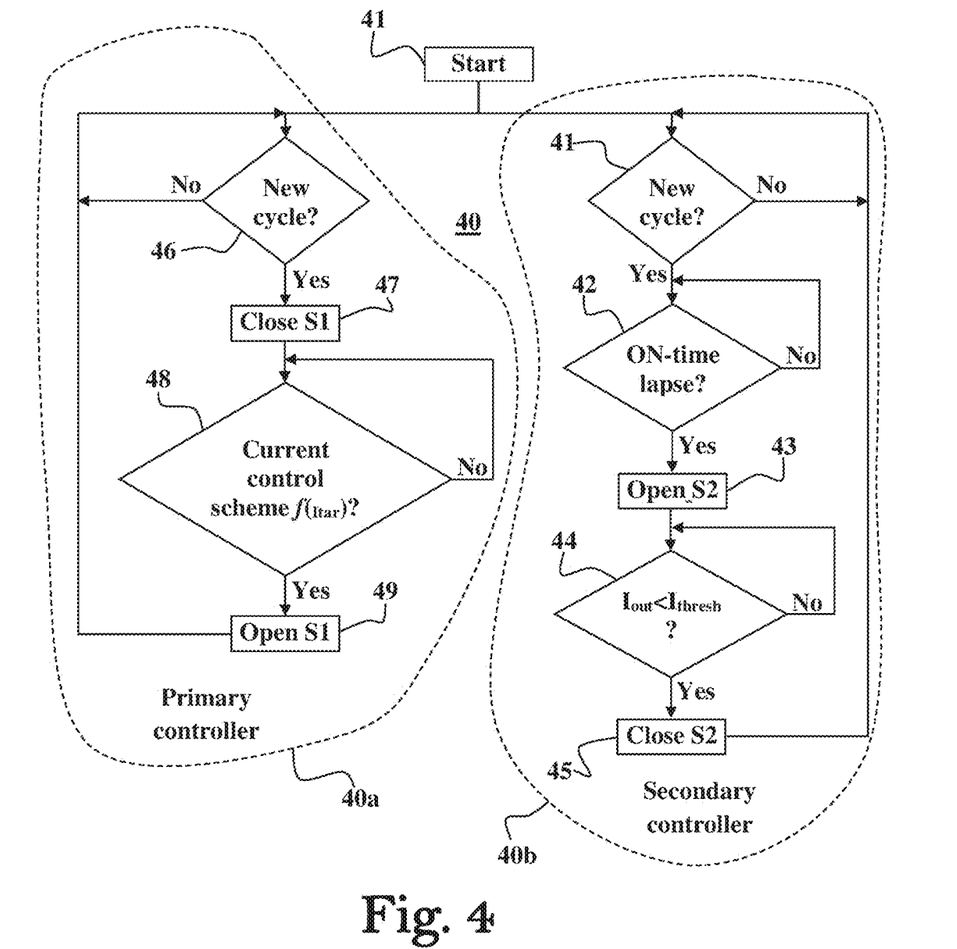
FIG. 4 is a flow chart schematically illustrating control of the buck and boost switched by the primary and secondary controllers, respectively.

FIG. 4 is a flow chart 40 schematically illustrating control of the buck and boost switches by the primary and secondary controllers, 40a and 40b, respectively, according to some possible embodiments. When the control system (12) starts its operation, the primary controller (12a) waits in step 46 until the beginning of a clock cycle of the clock signal (12g). Whenever a new clock cycle begins, in step 47 the primary controller (12a) generates control signals for changing the state of the buck switch S1 into a closed (ON) state. Thereafter, in step 48, the primary controller (12a) carries out the input current control scheme for regulating the input current ($I_{in}$) to converge to the target current $I_{tar}$, determined by the primary controller. When conditions to open the buck switch S1 been fulfilled, according to the current control scheme and the determined target current $I_{tar}$, in step 49 the primary controller (12a) generates control signals for changing the state of the buck switch S1 into an open (OFF) state. The control is then passed back to step 46 for maintaining the buck switch in the open state until a new clock cycle begins.

The secondary controller (12b) is also configured to wait for the beginning of a new clock cycle after system operation is started, as shown in step 41. After detecting that a new clock cycle has been started, in step 42 the secondary controller (12b) waits until lapse of the ON-time-interval, and thereafter, in step 43, generates control signals for changing the state of the boost switch S2 into an open (OFF) state. The secondary controller (12b) then monitors in step 44 the output current $I_{out}$ to determine when its value drops below the threshold current value $I_{thresh}$ determined by the master controller. Whenever the output current $I_{out}$ drops below the threshold current value $I_{thresh}$, in step 45 the secondary controller (12b) generates control signals for changing the state of the boost switch S2 into a closed (ON) state. The control is then passed back to step 41 for maintaining the boost switch S2 in the closed state along the beginning of the next clock cycle.

EXAMPLES

Example 1

Figure 5A:
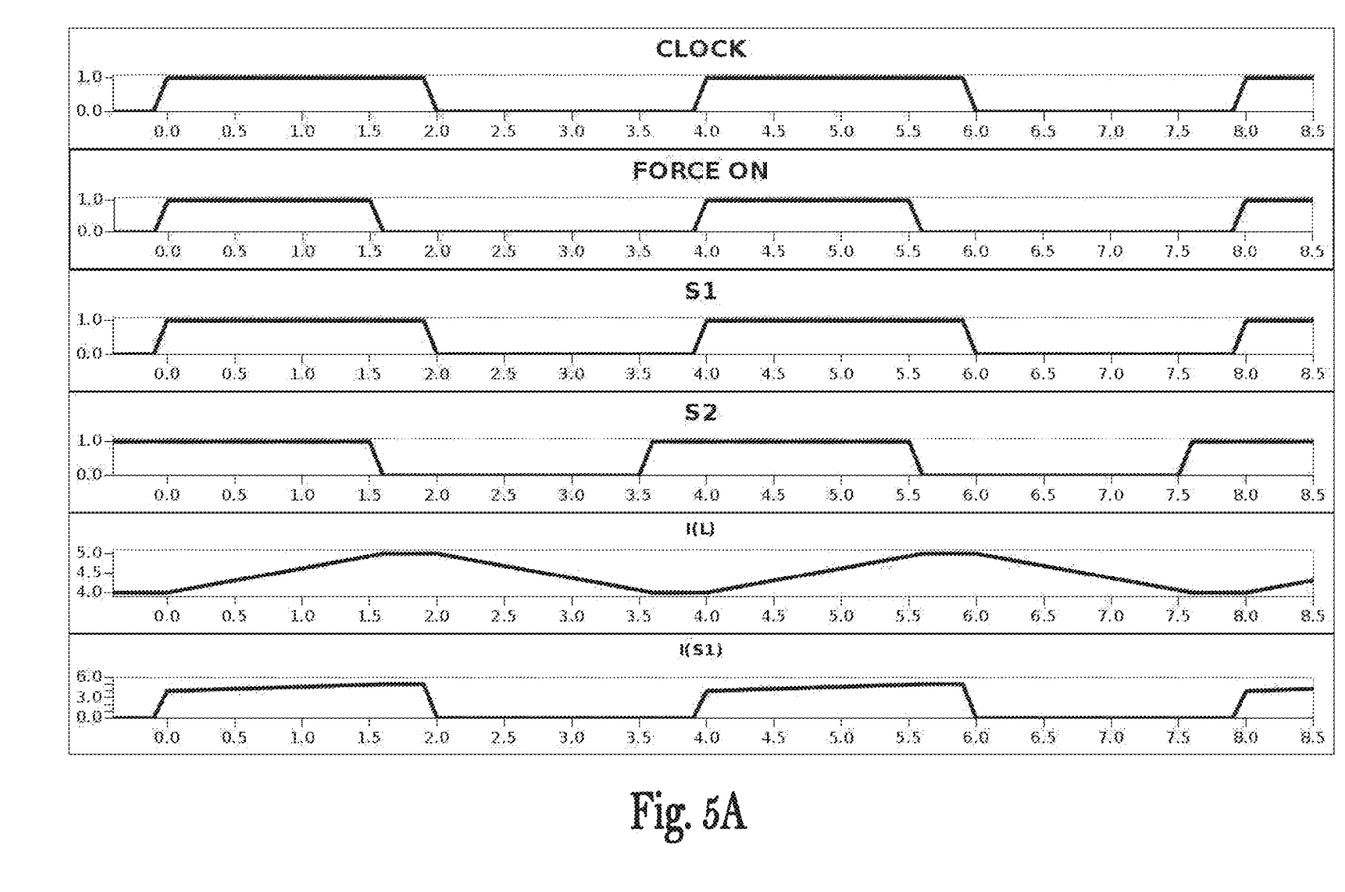

FIG. 5A shows plots for signals, states and currents of elements in the power supply system shown in FIG. 1B. In particular, FIG. 5A shows plots of the periodic time signal 12g (clock), the force-on signal (FORCE ON) showing the ON-time-interval, the states of the buck switch S1, the states of the boost switch S2, the current through the inductive element I(L), and the current through the buck switch device I(S1).

In this specific and non-limiting example the transformer ratio is 1:1, the input power source voltage is $V_{in}$=60V, the output voltage $V_{out}$=60V, the frequency of the periodic time signal 12g is F=250 Khz, inductance of the inductor is L=96 uH, the force-on duty cycle is $D_{FO}$=0.4, and the threshold current for the output stage is $I_{threshold}$=4 A.

Example 2

Figure 5B:
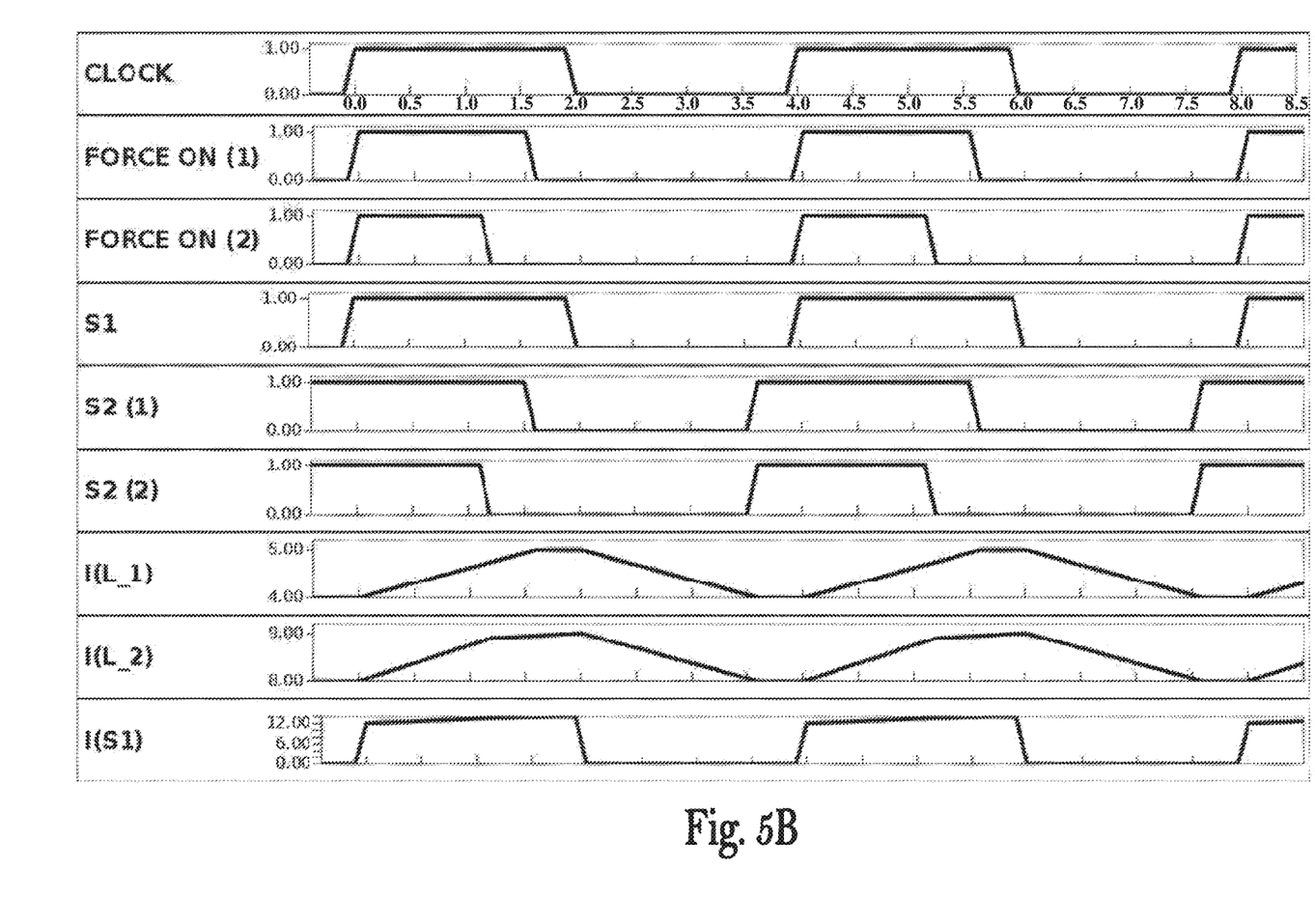

FIG. 5B shows plots for signals, states and currents of elements in one-to-two implementation of the power supply system shown in FIG. 1C. In particular, FIG. 5B shows plots of the periodic time signal 12g (clock), the force-on signals FORCE ON (1) and FORCE ON (2) showing the ON-time-intervals, the states of the buck switch S1, the states of the boost switches S2(1) and S2(2), the current through the inductive elements I(L1) and I(L1), and the current through the buck switch device I(S1).

In this specific and non-limiting example the transformer ratio is 1:1:1, the input power source voltage is $V_{in}$=60V, the output voltages are $V_{out(1)}$>=60V and $V_{out(2)}$=50V, the frequency of the periodic time signal 12g is F=250 Khz, inductances of the inductors are L(1)=96 uH and L(2)=80 uH, the force-on duty cycles are $D_{FO(1)}$=0.4 and $D_{FO(2)}$=0.3, and the threshold currents for the output stages are $I_{threshold(1)}$=4 A and $I_{threshold(2)}$=8 A.

As described hereinabove and shown in the associated figures, the present invention provides regulated power supplies/sources and control systems for regulating an unregulated input power source, and related methods. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:

1. An electrical power source configured to receive a three-phase power supply, said electrical power source comprising: an active three-phase rectifier electrically connectable to said three-phase power supply and configured and operable to generate a positive output, a negative output, and an intermediate output, therefrom; a virtual ground circuitry electrically connected to said positive, negative, and intermediate outputs, and configured to generate a virtual ground therefrom; a first current controlled power supply unit electrically connected to said positive and intermediate outputs and configured and operable to regulate an input current said first current controlled power supply unit; a second current controlled power supply unit electrically connected to said negative and intermediate outputs and configured and operable to regulate an input current said second current controlled power supply unit; and at least one controller configured and operable to determine a target current for said first current controlled power supply unit based on said positive output of said active three-phase rectifier and said virtual ground, and a target current for said second current controlled power supply unit based on said negative output of said active three-phase rectifier and said virtual ground.

2. The electrical power source of claim 1 wherein the at least one controller is configured and operable to use a load factor value determined for regulating the input currents of the first and second current controlled power supply units.

3. The electrical power source of claim 2 wherein the load factor is determined based on at least one output voltage of the first and second current controlled power supply units.

4. The electrical power source of claim 1 comprising at least one auxiliary bad electrically connected to the positive and negative outputs of said active three-phase rectifier, and wherein the at least one controller is configured and operable to determine the target current of each of the first and second current controlled power supply units based on the load factor value, an input voltage of said current controlled power supply unit, and an electrical current through said auxiliary load.

5. The electrical power source of claim 1 wherein the first and the second current controlled power supply units are configured as buck-boost synchronized regulators having a common boost output stage electrically coupled to buck input stages of said first and second current controlled power supply units, and wherein the at least one controller is configured and operable for regulating output current of said common boost output stage, and wherein each of the first and second current controlled power supply units comprises a respective controller for regulating an input current thereof.

6. The electrical power source of claim 1 comprising at least one transformer for electrically coupling between the positive, negative, and intermediate, outputs of the active three-phase rectifier and the first and second current controlled power supply units.

7. The electrical power source of claim 6 wherein the at least one controller is configured and operable to activate a boost switch of the common output stage whenever the electrical current through an inductor of the common boost output stage is smaller than a determined value.

8. The electrical power source of claim 7 wherein the at least one controller is configured and operable to deactivate the boost switch of the common output stage at a determined time within each cycle of a clock signal.

9. An electrical power source configured to receive a three-phase power supply, said electrical power source comprising: an active three-phase rectifier electrically connectable to said three-phase power supply and configured and operable to generate a positive output, a negative output, and an intermediate output, therefrom; a virtual ground circuitry electrically connected to said positive, negative, and intermediate outputs, and configured to generate a virtual ground therefrom; a first buck-boost current controlled power supply unit having a buck input stage electrically connected to said positive and intermediate outputs and configured and operable to regulate an input current of said first buck-boost current controlled power supply unit based on said positive output and said virtual ground; and a second buck-boost current controlled power supply unit having a buck input stage electrically connected to said negative and intermediate outputs and configured and operable to regulate an input current said second buck-boost current controlled power supply unit based on said negative output and said virtual ground, wherein the first and second buck-boost current controlled power supply units have a common boost output stage electrically coupled by a transformer to the buck input stages of said first and second buck-boost current controlled power supply units.

10. The electrical power source of claim 9 comprising at least one controller configured and operable to activate a boost switch of the common output stage whenever the electrical current through an inductor of the common boost output stage is smaller than a determined value.

11. The electrical power source of claim 10 wherein the at least one controller is configured and operable to deactivate the boost switch of the common output stage at a determined time within each cycle of a clock signal.

\* \* \* \* \*